United States Patent

Masayoshi et al.

[11] Patent Number: 5,582,316
[45] Date of Patent: Dec. 10, 1996

[54] CAP OPERATING MECHANISM

[75] Inventors: Takahashi Masayoshi, Tokyo; Ooya Hajime, Saitama; Tsushima Masahiro, Tokyo; Kamishima Kazuo, Toyama; Takashima Hiroaki, Toyama; Kawada Yoshio, Toyama, all of Japan

[73] Assignees: S&B Foods, Inc., Tokyo; Shirouma Plastics Kogyo Inc., Toyama, both of Japan

[21] Appl. No.: 211,626
[22] PCT Filed: Aug. 14, 1993
[86] PCT No.: PCT/JP93/01154
   § 371 Date: Jun. 20, 1994
   § 102(e) Date: Jun. 20, 1994
[87] PCT Pub. No.: WO94/05557
   PCT Pub. Date: Mar. 17, 1994

[30] Foreign Application Priority Data

Aug. 28, 1992 [JP] Japan ................................ 4-254101

[51] Int. Cl.[6] ................................................ B65D 43/26
[52] U.S. Cl. ............................ 220/264; 215/244; 220/335
[58] Field of Search ................................. 215/235, 237, 215/244; 220/263, 264, 335

[56] References Cited

U.S. PATENT DOCUMENTS

| | | | |
|---|---|---|---|
| 1,496,702 | 6/1924 | Zilker | 220/263 |
| 1,499,146 | 6/1924 | Bernard | 220/263 |
| 2,828,042 | 3/1954 | Hyman et al. | |
| 4,561,563 | 12/1985 | Woods | 220/264 |
| 4,940,167 | 6/1990 | Fillmore et al. | 215/237 |

FOREIGN PATENT DOCUMENTS

| | | |
|---|---|---|
| 2112331 | 9/1972 | Germany . |
| 59-40009 | 3/1984 | Japan . |
| 60-179645 | 11/1985 | Japan . |

Primary Examiner—David Scherbel
Assistant Examiner—Terrence R. Till
Attorney, Agent, or Firm—Birch, Stewart, Kolasch & Birch, LLP

[57] ABSTRACT

A cap operating mechanism is adapted to open or close the cap by depressing a push button. Upon depression of a push button 5 against a restoring force of an elastic member 4, a forward end 8b of a push rod member 8 pushes groove 6 serving for cap opening which is located, in this state, at a relatively short distance from the push button 5 and thereby rotates a cap 3 around an axis 2 of a hinged coupler to its opened position. After the push button 5 has been restored under a restoring force of the elastic member 4 to its home position, depressing the button 5 again causes the forward end 8b of the push rod member 8 to push a groove 7 serving for cap closing and thereby rotates the cap 3 around the axis 2 of the hinged coupler to its closed position. At this moment, an open/close switching member 9 switches the forward end 8b of the push rod member 8 between a position of engagement with the groove 6 serving for cap opening occurring as the cap 3 is closed and a position of engagement with the groove 7 serving for cap closing occurring as the cap 3 is opened.

14 Claims, 9 Drawing Sheets

CAP OPERATING MECHANISM

FIELD OF THE INVENTION

This invention relates to a cap operating mechanism for a cap mounted on an opening's base fixed to a container's opening so as to be pivotally opened and closed and more particularly to such mechanism utilizing a push button to open and close the cap.

BACKGROUND OF THE INVENTION

A cap operating mechanism is known, in which the cap is normally biased by a spring to be opened so that the cap is opened upon depression of a push button exclusively used to open the cap and the cap is closed against the biasing force of the spring.

However, such conventional mechanism has inconveniently required quite different actions to open the cap and to close the cap, so it is possible for a user to open the cap of a container, held in his or her one hand with the same hand, but it is impossible to close the cap in this manner.

SUMMARY OF THE INVENTION

Accordingly, it is a principal object of the invention to provide a cap operating mechanism so improved that a cap pivotally mounted on the opening's base fixed around the container's opening may be opened or closed in so-called one touch fashion by depressing a push button or the like.

To achieve the object set forth above, the invention provides a cap operating mechanism comprising a cap pivotally mounted on a container's opening, and cap rotating means provided on said cap so as to be operatively associated with depression exerted on depressor means such as a push button to rotate said cap to its opened or closed position.

The invention also provides a cap operating mechanism comprising a cap pivotally mounted on a container's opening, and cap rotating means provided on said cap so as to be operatively associated with depression exerted on single depressor means such as a single push button to rotate said cap to its opened or closed position.

The invention also provides a cap operating mechanism comprising a cap pivotally mounted on a container's opening, and cap rotating means provided on said cap so as to be operatively associated with depression exerted on a depressor exclusively used for cap opening to rotate said cap to its opened position and operatively associated with depression exerted on a depressor exclusively use for cap closing to rotate said cap to its closed position.

The invention also provides the cap operating mechanism as has been described hereinabove, wherein the depressor means is provided with elastic restoring means for elastically restoring said depressor means to its home position.

The invention also provides the cap operating mechanism including the separate depressors exclusively used for cap opening and cap closing, respectively, as has been described above, wherein these depressors operatively associated with said cap rotating means are integrated into single depressor means of seesaw type arranged so that, when one end thereof serving as one depressor is depressed around a rotating fulcrum provided on the middle of said single depressor means, the other end serving as the other depressor is automatically restored to its initial position.

The invention also provides the cap operating mechanism as has been described hereinabove, wherein the cap is rotated by the push rod member operatively associated with the depressor means.

The invention also provides a cap operating mechanism comprising a cap pivotally mounted on a container's opening, cap rotating means provided on said cap to rotate said cap to its opened or closed position by push rod means operatively associated with depressor means such as a push button, and direction selective cap biasing means adapted to bias said cap to be rotated in the direction in which the cap is opened or in the direction in which said cap is closed depending on the angular position of said cap with respect to a transitional position predetermined on the rotational stroke of said cap.

The invention also provides a cap operating mechanism comprising a cap pivotally mounted on a container's opening, cap rotating means provided on said cap to rotate said cap to its opened or closed position by push rod means operatively associated with depressor means such as a push button, elastic restoring means for elastically restoring said depressor means to its home position, and direction selective cap biasing means adapted to bias said cap to be rotated in the direction in which said cap is opened or in the direction in which said cap is closed depending on the angular position of said cap with respect to a transitional position predetermined on the rotational stroke of said cap.

The invention also provides the cap operating mechanism as has been described just above, wherein the elastic restoring means for elastically restoring the depressor means to its home position and the direction selective cap biasing means adapted to bias said cap to be rotated in the direction for cap opening or cap closing substantially comprise the same elastic member.

The invention also provides a cap operating mechanism comprising a cap pivotally mounted on a container's opening, cap rotating means provided on said cap to rotate said cap to its opened or closed position by push rod means operatively associated with depressor means such as push buttons used exclusively for cap opening and cap closing, respectively, said cap rotating means including a groove serving for cap opening and adapted to be rotated around an axis of a hinged coupler to a position at a relatively short distance from said depressor means as said cap is closed but to a position at a relatively long distance from said depressor means as said cap is opened and a groove serving for cap closing and adapted to be rotated around said axis to a position at a relatively long distance from said depressor means as said cap is close but to a position at a relatively short distance from said depressor means as said cap is opened, and the push rod means associated with said depressor used exclusively for cap opening is engaged with said groove serving for cap opening as said cap is closed and the push rod means associated with said depressor used exclusively for cap closing is engaged with said groove serving for cap closing as said cap is opened.

The invention also provides a cap operating mechanism comprising a cap pivotally mounted on a container's opening, cap rotating means provided on said cap to rotate said cap to its opened or closed position by push rod means operatively associated with depressor means, said cap rotating means including a groove serving for cap opening and adapted to be rotated around an axis of a hinged coupler to a position at a relatively short distance from said depressor means as said cap is closed but to a position at a relatively long distance from said depressor means as said cap is opened and groove serving for cap closing being continuous to said groove serving for cap opening across a transition step and adapted to be rotated around said axis to a position at a relatively long distance from said depressor means as said cap is closed but to a position at a relatively short distance from said depressor means as said cap is opened, and open/close switching means adapted to switch a forward end of said push rod means between a position of engagement with said groove serving for cap opening occurring as said cap is closed and a position of engagement with said groove serving for cap closing occurring as said cap is opened.

The invention also provides the cap operating mechanism as has been described just above, wherein the open/close switching means comprises said step across which said grooves are continuous to each other.

The invention also provides the cap operating mechanism as has been described Just above, where in said cap is provided with cap rotating means adapted to be rotated around the axis of the hinged coupler to a position on the said opposite to said groove serving for cap opening as said cap is closed but to a position on the said opposite to said groove serving for cap closing as said cap is opened, and said open/close switching means comprising an elastic member is provided between said cap rotating means and said push rod means so that the forward end of said push rod means is guided into the groove serving for cap opening as said cap is closed and into the groove serving for cap closing as said cap is opened under the biasing force of said elastic member.

The invention also provides the cap operating mechanism as has been described above, particularly comprising cap rotating means adapted to be rotated around the axis of the hinged coupler to a position on the side opposite to said groove serving for cap opening as said cap is closed but to a position on the side opposite to said groove serving for cap closing as said cap is opened, open/close switching means having one end engaged with said cap rotating means and the other end slidably engaged along the push rod means, and elastic restoring means normally compressed between open/close switching means and the depressor means for elastically restoring said depressor means to its home position so that, under the biasing force of said elastic restoring means, said open/close switching means guides the forward end of the push rod means into the groove serving as cap opening as said cap is closed and into the groove serving for cap closing as said cap is opened.

The invention also provides the cap operating mechanism as has been described hereinabove, wherein the cap is pivotally mounted on the container's opening so as to be opened or closed transversely of said container's opening.

The cap operating mechanism of this invention constructed as has been described hereinabove allows the cap to be rotated from its closed position to its opened position in operative association with the depressor means such as the push button merely by depressing this push button with one touch action and then the content can be taken out from the container through the opening thereof. The cap thus opened can be rotated in operative association with said depressor means to its closed position also by depressing the depressor means with one touch action.

The cap operating mechanism of the invention allows also the cap to be rotated to its opened or closed position in operative association with the single depressor means such as the single push button by depressing this single push button.

The cap operating mechanism of the invention allows also the cap to be rotated from its closed position to its opened position by depressing the depressor destined from its opened position to its closed position by depressing the depressor destined to be used exclusively for cap closing.

The cap operating mechanism of the invention allows also the cap to be rotated from its closed position to its opened position in operative association with the depressor means such as the push button by depressing this push button against a biasing force of elastically restoring means. Upon release of a depression on the depressor means such as the push button, the depressor means is restored by said biasing force to its home position, and then the cap can be rotated again from its opened position to its closed position in operative association with the same depressor means by depressing again this depressor means against said biasing force. In this way, the cap can be opened or closed with one touch action.

With the cap operating mechanism of the invention, the depressors destined to be used exclusively for cap opening and for cap closing, respectively, of the cap rotating means can be integrated into the single depressor means of seesaw type, of which opposite ends serving as the respective depressors may be alternately depressed around the rotational fulcrum provided on the middle of this single depressor means to open and close the cap.

The cap operating mechanism of the invention allows also the cap to be rotated to its opened position by depressing the depressor means such as the push button so that the push rod means operatively associated with this depressor means rotates the cap towards its opened position and allows the cap thus opened to be rotated again to its closed position by depressing again this depressor means against the biasing force of the elastic restoring means so that the push rod means operatively associated with said depressor means rotates the cap toward its closed position.

With the cap operating mechanism of the invention particularly including the direction selective cap biasing means adapted to bias the cap to be rotated in the direction in which the cap is opened or closed depending on the angular position of the cap with respect to the transitional position predetermined on the rotational stroke of the cap, the cap can be automatically opened or closed under the action of said direction selective cap biasing means by partially depressing the depressor means such as the push button so as to rotate the cap to said transitional position predetermined on the rotational stroke of the cap in the direction of cap opening or cap closing.

With the cap operating mechanism of the invention particularly including the elastic restoring means for elastically restoring the depressor means to its home position and the above-mentioned direction selective cap biasing means adapted to bias the cap to be rotated in the direction in which the cap is opened or closed depending on the angular position of the cap with respect to the transitional position predetermined on the rotational stroke of the cap, as previously mentioned, the cap can be automatically opened or closed under the action of said direction selective cap biasing means by partially depressing the depressor means such as the push button so as to rotate the cap in the direction of cap opening or cap closing to said transitional position predetermined on the rotational stroke of the cap, and thereupon the depressor means can be automatically restored to its home position.

The cap operating mechanism of the invention allows also said elastic restoring means tending to restore the depressor means to its home position and said direction selective cap biasing means tending to rotate the cap in the direction of cap opening or cap closing to be realized substantially by one and same elastic means.

The cap operating mechanism of the invention allows also the cap to be rotated from its closed position to its opened position by depressing the depressor destined to be used exclusively for cap opening so that the push rod means operatively associated with this depressor rotates the groove serving for cap opening and closely opposed to this push rod means and to be rotated from its opened position to its closed position by depressing the depressor destined to be used exclusively for cap closing so that the push rod means operatively associated with this depressor rotates the groove serving for cap closing and closely opposed to this push rod means.

With the cap operating mechanism of the invention, the cap can be rotated from its closed position to its opened position by depressing the depressor destined to be used exclusively for cap opening so that the push rod means operative associated with this depressor rotates the groove serving for cap opening and closely opposed to this push rod means and can be rotated from its opened position to its closed position by depressing the depressor destined to be used exclusively for cap closing so that the push rod means operatively associated with this depressor rotates the groove serving for cap closing and closely opposed to this push rod means.

With the cap operating mechanism of the invention, the cap can be rotated from its closed position to its opened position by depressing the depressor means such as the push button so that push rod means operatively associated with this depressor means rotates the groove serving for cap opening and closely opposed to this push rod means and thereupon the groove serving for cap closing is rotated to the position adjacent the push rod means and, at the same time, the open/close switching means causes the forward end of the push rod means to be engaged with the groove serving for cap closing. The cap thus opened can be rotated to its closed position by depressing the depressor means such as the push button so that the push rod means operatively associated with this depressor means rotates the groove serving for cap closing and thereupon the groove serving for cap opening is rotated to the position adjacent the push rod means and, at the same time, the open/close switching means causes the forward end of the push rod means to be engaged with the groove serving for cap opening. From this state, the depressor means may be depressed to open the cap as has previously been mentioned.

With the cap operating mechanism of the invention particularly characterized in that the open/close switching means comprises the transition step across which said groove serving for cap opening is continuous to said groove serving for cap closing, the forward end of the push rod means confronts the groove serving for cap closing when the cap is in its opened state and confronts the groove serving for cap opening when the cap is in its closed state.

With the cap operating mechanism of the invention, the open/close switching means provided between the cap rotating means, which is rotated around the hinged coupler's axis to the position on the side opposite to the groove serving for cap opening as the cap is closed, and the push rod means guides the forward end of the push rod means into the groove serving for cap opening so that the depressor means may be depressed to rotate said groove serving for cap opening by the push rod means and thereby to open the cap, and said open/close switching means provided between the cap rotating means, which is rotated around the hinged coupler's axis to the position on the side opposite to the groove serving for cap closing, and the push rod means guides the forward end of the push rod means into the groove serving for cap closing so that the depressor means may be depressed to rotate the groove serving for cap closing by the push rod means and thereby to close the cap.

With the cap being in its closed state, the depressor means may be depressed against the biasing force of the elastically restoring means tending to restore the depressor to its home position to exert this biasing force upon the open/close switching means also and said open/close switching means functions under such biasing force to guide the forward end of the push rod means into the groove serving for cap opening so that the push rod means rotates this groove serving for cap opening to open the cap. With the cap being in its opened state, said open/close switching means functions under said biasing force to guide the forward end of the push rod means into the groove serving for cap closing so that the push rod means rotates this groove serving for cap closing to close the cap. With the cap being in its opened state, the open/close switching means is located between the cap rotating means, which has been rotated around the hinged coupler's axis to the position on the side opposite to the groove serving for cap opening, and the push rod means and functions under the biasing force of the elastic restoring means to guide the forward end of the push rod means into the groove serving for cap closing and, with the cap being in its closed state, the open/close switching means is located between the cap rotating means, which has been rotated around the hinged coupler's axis to the position on the side opposite to the groove serving for cap closing, and the push rod means and functions under said biasing force of the elastic restoring means to guide the forward end of the push rod means into the groove serving for cap opening.

It is also possible without a departure from the spirit and scope of this invention to mount the cap on the container's opening so as to be pivotally opened and closed transversely of said container's opening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of example with reference to the accompanying drawings, in which.

DESCRIPTION OF THE PREFERRED EMBODIMENTS

Figure 1:
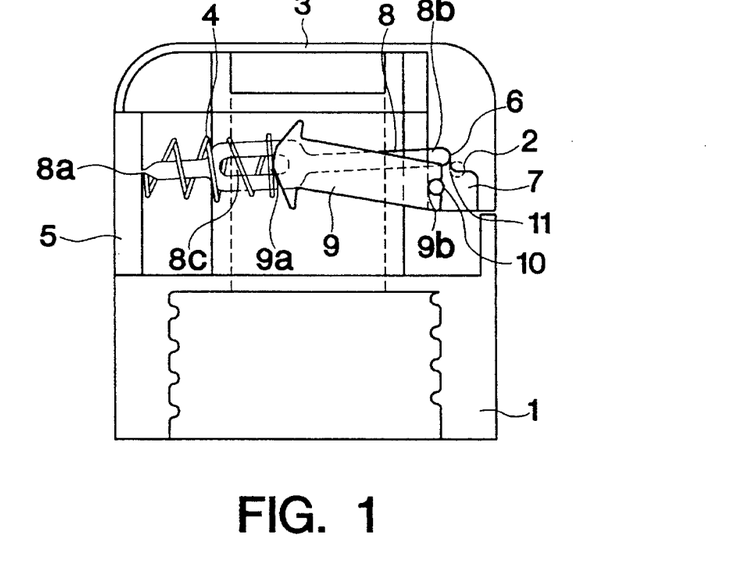
FIG. 1 is a diagram schematically showing, in a axial section, important parts of the cap operating mechanism constructed as a first embodiment of the invention, with a cap being in its closed position.
Figure 2:
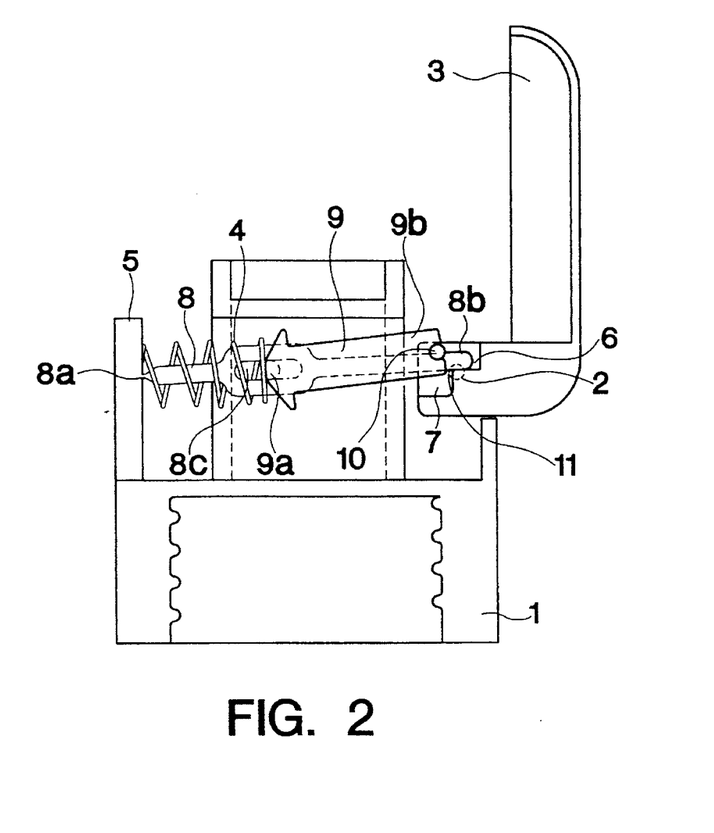
FIG. 2 is a diagram similar to FIG. 1, schematically showing said important parts of the embodiment shown by FIG. 1, with a push button being on the way to its initial position after the cap has been opened.
Figure 3:
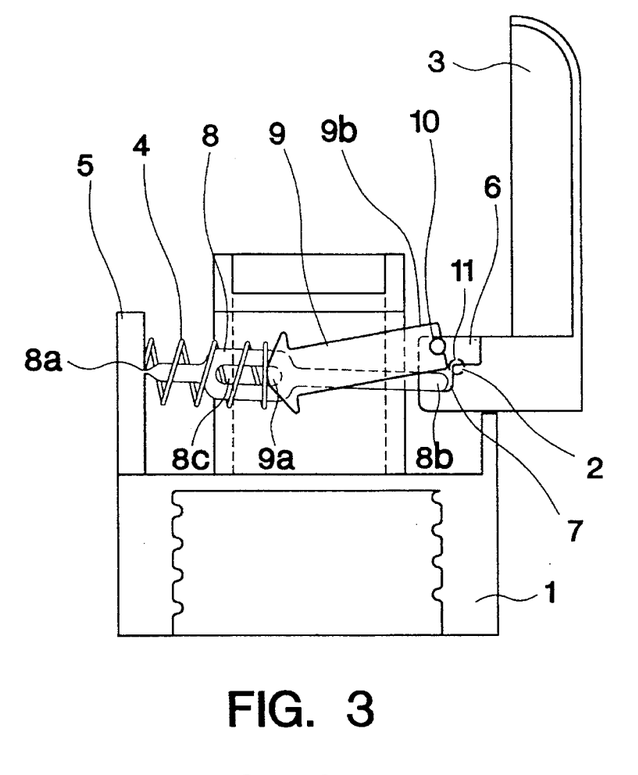
FIG. 3 is a diagram similar to FIG. 1, schematically showing said important parts of the embodiment shown by FIG. 1, with the cap being in its opened position.

Referring to FIGS. 1 through 3, there is shown a first embodiment of the cap operating mechanism constructed according to the invention, in which a reference numeral 1 designates an opening's base firmly threaded around a container's opening and a cap 3 is mounted on said opening's base 1 by a hinged coupler comprising conventionally well known means so that said cap 3 may be pivotally opened and closed around an axis 2 of said hinged coupler. The opening's base 1 is provided at a side thereof confronting an end of the cap 3 opposite to said axis 2 with a push button 5 adapted to be depressible toward the hinged coupler against a restoring force of an elastic member 4 such as a coil spring.

The push button 5 constitutes depressor means as one of features of the invention and the elastic member 4 constitutes elastic restoring means as the other feature of the invention, by which a restoring force is exerted on said depressor means.

The cap 3 is provided, on its side at which said cap 3 is mounted on the opening's base 1 by the hinged coupler, with a pair of grooves 6, 7 serving for cap opening and cap closing, respectively. The groove 6 participating in operation of opening the cap 3 is located at a relatively short distance from said push button 5 when the cap 3 is in its closed position, as shown by FIG. 1 and located at a relatively long distance from said push button 5 when the cap 3 is in its opened position, as shown by FIGS. 2 and 3. The groove 7 is continuous to said groove 6 across a transition step 11 and takes part in operation of closing the cap 3. This groove 7 serving for cap closing is located at a relatively long distance from said push button 5 when the cap 3 is in its closed position, as shown by FIG. 1 and located at a relatively short distance from said push button 5 when the cap 3 is in its opened position, as shown by FIGS. 2 and 3.

A reference numeral 8 designates a push rod member extending between the push button 5 and the cap 3, which has a base end 8a pivotally connected to the push button 5 and forward end 8b being engagable with the groove 6 serving for cap opening and adapted to be located at the relatively short distance from the push button 5 after the cap 3 has been closed and said push button 5 has been restored to its initial position, as shown by FIG. 1 or with the groove 7 serving for cap closing after the cap 3 has been opened, as shown by FIG. 3.

The push rod member 8 constitutes push rod means as one feature of the invention.

The depressor means including said push button 5, the push rod means comprising said push rod member 8 and the grooves 6, 7 formed in the cap 3 constitute together cap rotating means as one of feature of the invention.

A reference numeral 9 designates an open/close switching member adapted to switch the forward end 8b of said push rod member 8 between a position at which said forward end 8b is engaged with the groove 6 serving for cap opening and a position at which said forward end 8b is engaged with the groove 7 serving for cap closing of the cap 3 when the cap 3 is in its closed position and its opened position, respectively.

The open/close switching member 9 constitutes open/close switching means as one feature of the invention.

In the instant embodiment, the open/close switching member 9 has a forward end 9a slidably engaged with a slot 8c longitudinally formed in the push rod member 8 along an intermediate length thereof and a base end 9b pivotally connected on a pin 10 which is movable around the hinged coupler's axis 2 between a position on the side opposite to the groove 6 serving for cap opening when the cap 3 is in its closed position and a position on the side opposite to the groove 7 serving for cap closing when the cap 3 is in its opened position.

With the present embodiment, the elastic member 4 tending to bring said push button 5 back to its initial position is normally compressed between said push button 5 and the open/close switching member 9 so that, under the biasing force of said elastic member 4, the forward end 8b of the push rod member 8 may be guided by the forward end 9a of the open/close switching member 9 into the groove 6 serving for cap opening when the cap 3 is in its closed position and into the groove 7 serving for cap closing when the cap 3 is in its opened position.

More specifically, as the cap 3 is closed, the base end 9b of the open/close switching member 9 is rotated around the hinged coupler's axis 2 to a position on the side opposite to the groove 6 serving for cap opening and simultaneously the forward end 9a is moved to a position at which said forward end 9a biases the slot 8c of the push rod member 8 upwards, as seen in FIG. 1, so that the forward end 8b of the push rod member 8 may be guided into the groove 6 serving for cap opening of the cap 3 under the biasing force of the elastic member 4. The base end 9b of the open/close switching member 9 is rotated around the hinged coupler's axis 2 to a position on the side opposite to the groove 6 serving for cap opening as the cap 3 is opened, and simultaneously the forward end 9a is moved to a position at which said forward end 9a biases the slot 8c of the push rod member 8 downwards, as seen in FIG. 3, so that the forward end 8b of the push rod member 8 may be guided into the groove 7 serving for cap closing of the cap 3 under the biasing force of the elastic member 4.

The elastic member 4 which is normally compressed between the push button 5 and the open/close switching member 9 biases said open/close switching member 9 and consequently the base end 9b of this open/close switching member 9 biases the pin 10 to move around the hinged coupler's axis 2, as has already been mentioned, to the position on the side opposite to the groove 6 serving for cap opening as the cap 3 is closed and to the position on the side opposite to the groove 7 serving for cap closing as the cap 3 is opened. As the cap 3 is closed, the elastic member 4 biases the cap 3 to be rotated so as to maintain the cap 3 in its closed position as seen in FIG. 1 and, as the cap 3 is opened, the elastic member 4 biases the cap 3 to be rotated so as to maintain the cap 3 in its opened position as seen in FIG. 3. In this manner, the elastic member 4 constitutes direction selective cap biasing means as one feature of the invention, which biases the cap 3 to be rotated in the direction of cap opening or cap closing depending on the angular position of the cap 3 with respect to a predetermined transitional position on its rotational stroke.

The pin 10 provided on the cap 3 constitutes opening/closing rotation control means adapted to be moved around the hinged coupler's axis 2 to the position on the side opposite to the groove 6 serving for cap opening as the cap 3 is closed position and to the position on the side opposite to the groove 7 serving for cap closing as the cap 3 is opened.

In the present embodiment of the cap operating mechanism, the elastic member 4 serves not only as the elastic restoring means adapted for elastic restoring the depressor means to its initial position and the direction selective cap biasing means adapted for rotationally biasing the cap in the direction of cap opening or cap closing, but also serves as the elastic means for said open/close switching means.

The first embodiment of the cap operating mechanism constructed according to the invention as has been described above operates in a manner as follows:

Starting from the state of FIG. 1 in which the cap 3 is in its closed position, upon depression of the push button 5 against the restoring force of the elastic member 4 towards the hinged coupler, the forward end 8b of the push rod member 8 pushes the groove 6 serving for cap opening which is located, in this state, at a relatively short distance from the push button 5 until said groove 6 serving for cap opening reaches the position at a relatively long distance from said push button 5, as shown by FIG. 2 so that the axis 2 of the hinged coupler may be rotated clockwise as viewed in FIG. 1 to open the cap 3. Upon release of a user's hold from the push button 5 after the cap 3 has reached its opened position, the push button 5 is restored under the restoring force of the elastic member 4 to its home position diametrically opposite to the hinged coupler and the cap 3 is maintained at its opened position. At the same time, the forward end 8b of the push rod member 8 comes into engagement with the groove 7 serving for cap closing, as seen in FIG. 3, which is continuous to said groove 6 serving for cap opening across the transition step 11 and located, in this state, at a relatively short distance from the push button 5. Now the push button 5 is pushed again against the restoring force of the elastic member 4 towards the hinged coupler, causing the forward end 8b of the push rod member 8 to push the groove 7 serving for cap closing until said groove 7 serving for cap closing reaches the position at a relatively long distance from the push button 5 so that the axis 2 of the hinged coupler may be rotated counterclockwise as viewed in FIG. 3 to close the cap 3. From the state in which the cap 3 is in its closed position, upon release of a user's hold from the push button 5, the push button 5 is restored under the restoring force of the elastic member 4 to its home position diametrically opposite to the hinged coupler and the cap 3 is maintained at its closed position. Simultaneously, the forward end 8b of the push rod member 8 comes into engagement with the groove 6 serving for cap opening which is continuous to said groove 7 serving cap closing across the transition step 11 and located, in this state, at a relatively short distance from the push button 5.

During this process, the open/close switching member 9 switches the forward end 8b of said push rod member 8 between the position at which said forward end 8b is engaged with the groove 6 serving for cap opening as the cap 3 is closed and the position at which said forward end 8b is engaged with the groove 7 serving for cap closing as the cap 3 is opened.

Figure 4:
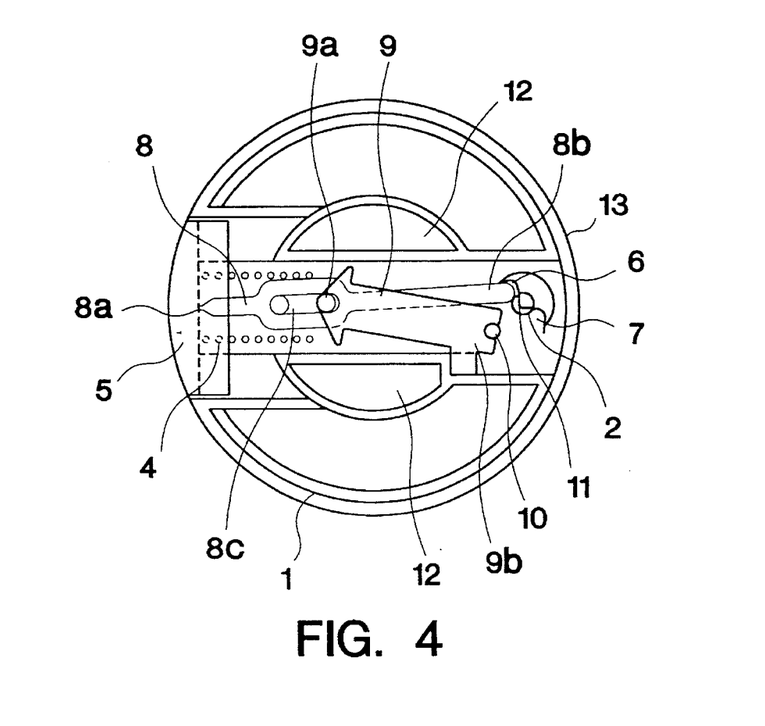
FIG. 4 is a diagram schematically showing, in a horizontal section, important parts of the cap operating mechanism constructed as a second embodiment of the invention, with a cap being in its closed position.
Figure 5:
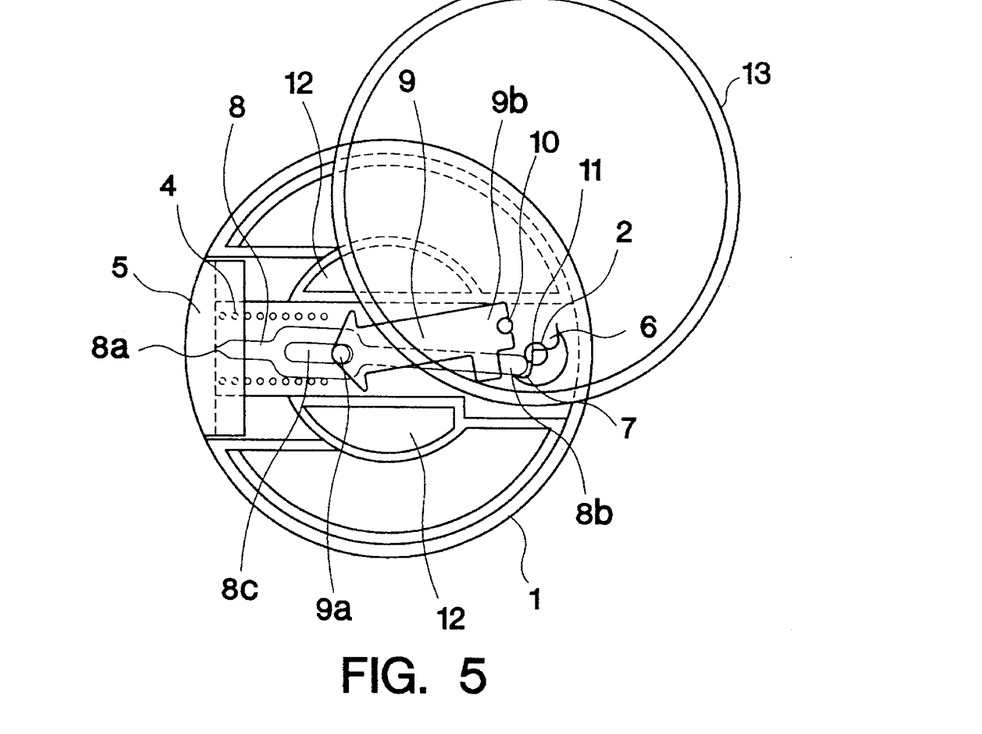
FIG. 5 is a diagram similar to FIG. 4, schematically showing said important parts of the embodiment shown by FIG. 4, with the cap being in its opened position.

Referring to FIGS. 4 and 5, there is illustrated a second embodiment of the cap operating mechanism wherein the container's opening 12 is provided with the hinged cap 13 adapted to be opened and closed transversely of the container's opening. Specifically, the cap 13 is mounted by a known hinged coupler on the opening's base 1 so that the cap 13 may be pivotally opened and closed transversely of the container's opening.

Except that the cap 13 is opened and closed transversely of the container's opening rather than upwards and downwards as in the first embodiment, the second embodiment is similar to the first embodiment in the remaining construction, operation and effect, so similar parts are designated by the same reference numerals in the drawings to facilitate understanding, and a further detailed description will be eliminated to avoid duplication.

It should be understood that the container's opening 12 in the first and second embodiments is located on both sides of a central zone occupied by the cap rotating means including the elastic member 4, the push rod member 8 and the open/close switching member 9 in order to avoid a situation where these members might interfere with the container's opening 12.

Figure 6:
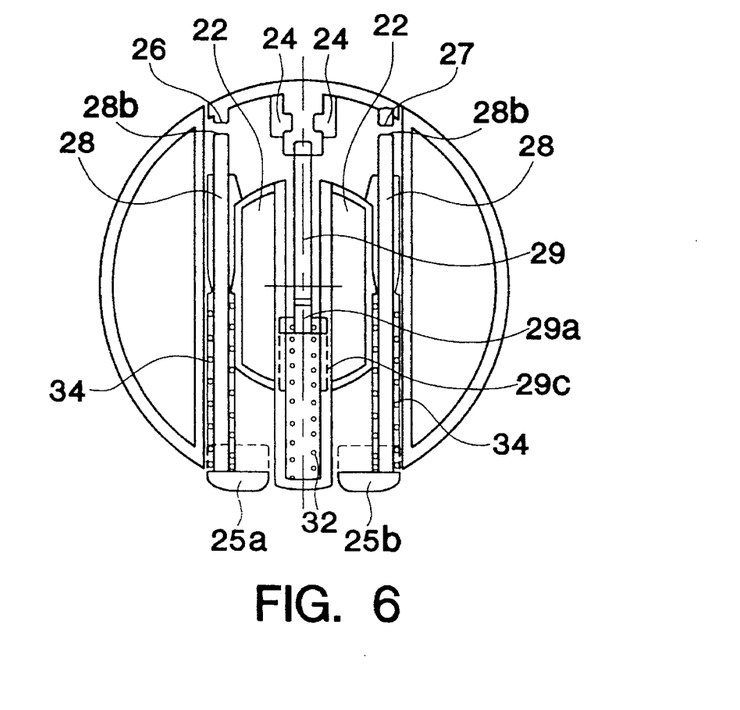
FIG. 6 is a diagram schematically showing, in a horizontal section, important parts of the cap operating mechanism constructed as a third embodiment of the invention, with a cap being in its closed position.
Figure 7:
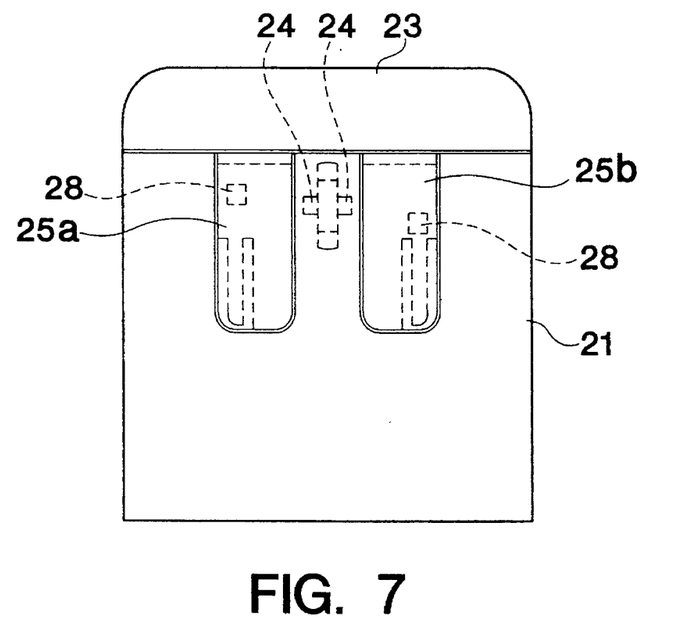
FIG. 7 is a diagram schematically showing, in a front view, said important parts of the embodiment shown by FIG. 6, with the cap being in its closed position.
Figure 8:
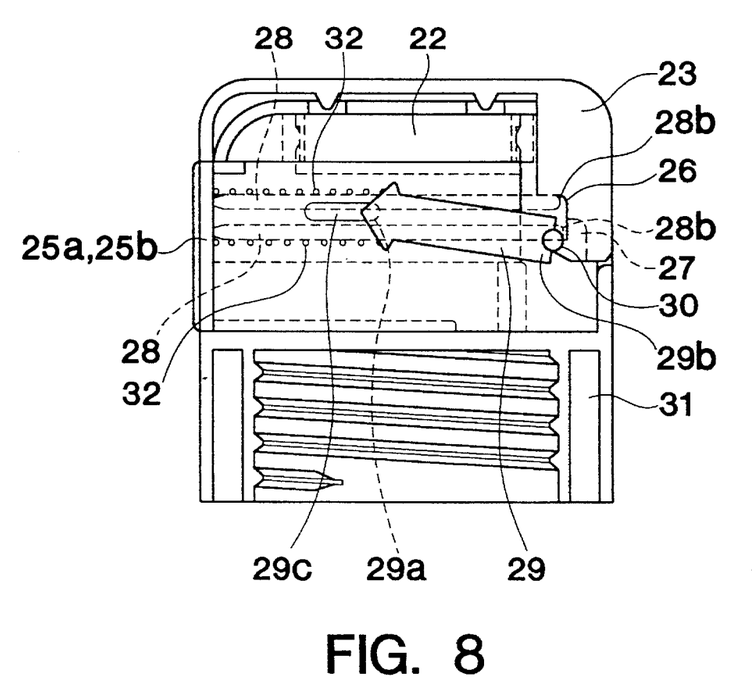
FIG. 8 is a diagram schematically showing, in a axial section, said important parts of the embodiment shown by FIG. 6, with the cap being in its closed position.

Referring to FIGS. 6 through 8, there is illustrated a third embodiment of the invention, in which the cap 23 is pivotally mounted on the container's opening 22 and provided with cap rotating means operatively associated with depression of a push button 25a exclusively used for cap opening to rotate the cap 23 to its opened position and operatively associated with depression of a push button 25b exclusively used for cap closing to rotate the cap 23 to its closed position.

The cap 23 is mounted by a known hinged coupler on the opening's base 31 so that the cap 23 may be pivotally opened and closed around the axis 24 of said hinged coupler. The push buttons 25a, 25b exclusively used for cap opening and cap closing, respectively, are provided with push rod members 28 exclusively used for cap opening and cap closing respectively.

The forward end 28b of the push rod member 28 exclusively used for cap opening cooperates with the groove 26 serving for cap opening adapted to be located at a relatively short distance from said push button 25a exclusively used for cap opening when the cap 23 is in its closed position but located at a relatively long distance from said push button 25a when the cap 23 is in its opened position and the forward end 28b of the push rod member 28 exclusively used for cap closing cooperates with the groove 27 serving for cap closing and adapted to be located at a relatively short distance from said push button 25b exclusively used for cap closing when the cap 23 is in its opened position but located at a relatively long distance from said push button 25b when the cap 23 is in its closed position.

Elastic members 34 such as coil springs extend between the push buttons 25a, 25b exclusively used for cap opening and for cap closing, respectively on one hand, and the opening's base 21, on the other hand.

In this embodiment, the push buttons 25a, 25b constitute together depressor means as one feature of the invention, the elastic members 34 constitute together elastic restoring means as one feature of the invention, by which a restoring force is exerted on the depressor means, and said push rod members 28 constitute push rod means as one feature of the invention.

A reference numeral 29 designates open/close switching member adapted to switch rotation of the cap 23 in the direction of cap opening or in the direction of cap closing, depending on the angular position of the cap 23 with respect to a predetermined transition position on the rotating stroke of the cap 23. In the present embodiment, the open/close switching member 29 has a forward end 29a slidably engaged with a slot 29c formed in the opening's base 31 so as to extend diametrically along an intermediate length and a base end 29b pivotally connected on a pin 30 which has moved around the axis of the hinged coupler to a position on the side opposite to the groove 26 serving for cap opening when the cap 23 is in its closed position and to a position on the side opposite to the groove 27 serving for cap closing when the cap 23 is in its opened position.

Thus, said pin 30 of the cap 23 constitutes cap rotating means as one feature of the invention, which is rotated around the axis of the hinged coupler to the position on the side opposite to the groove 26 serving for cap opening as the cap 23 is closed and to the position on the side opposite to the groove 27 serving for cap closing as the cap 23 is opened.

An elastic member 32 compressed between the forward end 29a of the open/close switching member 29 and the opening's base 31 functions to bias, by the base end 29b of the open/close switching member 29, the pin 30 which is rotated around the axis of the hinged coupler to the position on the side opposite to the groove 26 serving for cap opening as the cap 23 is closed, and to the position on the side opposite to the groove 27 serving for cap closing as the cap 23 is opened. More specifically, as the cap 23 is closed, the elastic member 32 biases the cap 23 to be rotated in the direction in which the cap 23 is maintained in its closed position, as seen in FIG. 8 and, as the cap 23 is opened, the elastic member 32 biases the cap 23 to be rotated in the direction in which the cap 23 is maintained in its opened position. Thus, the elastic member 32 constitutes direction selective cap biasing means as one feature of the invention, which biases the cap 23 to be rotated in the direction of cap opening or cap closing depending on the angular position of the cap 23 with respect to a transitional position predetermined on its rotational stroke.

With this specific embodiment of the cap operating mechanism characterized by a pair of depressors, i.e., the push button 25a exclusively used for opening the cap and the push button 25b exclusively used for closing the cap, the cap 23 can be rotated to its opened position in operative association with depression of the push button 25a exclusively for cap opening and can be rotated to its closed position in operative association with depression of the push button 25b exclusively used for cap closing. In this way, the open/close switching member 9 that is the essential component to the precedent embodiments utilizing a single push button is no longer necessary for this embodiment.

Figure 9:
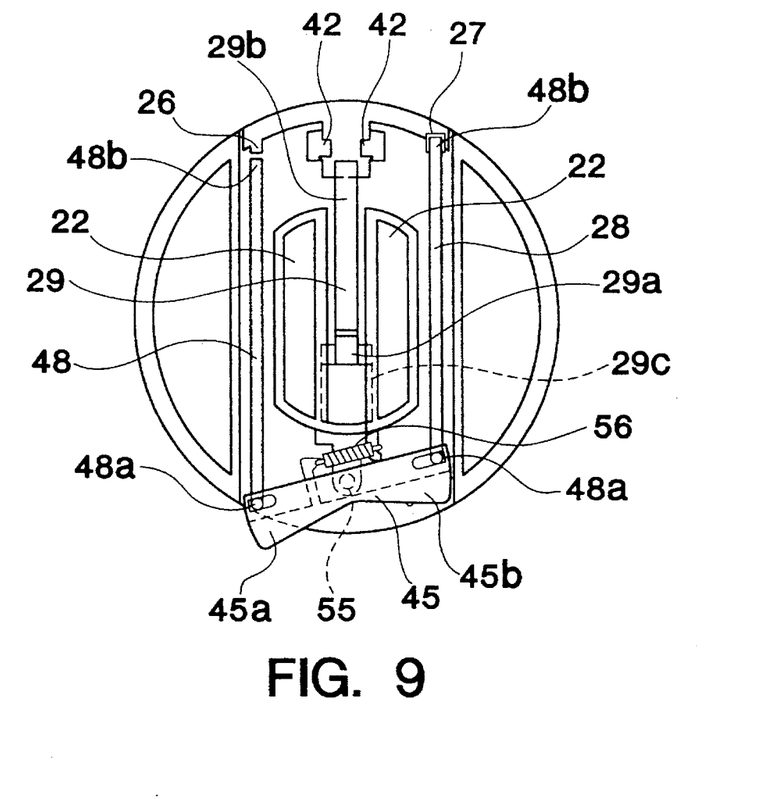
FIG. 9 is a diagram schematically showing, in a horizontal section, important parts of the cap operating mechanism constructed as a fourth embodiment of the invention, with a cap being in its closed position.
Figure 10:
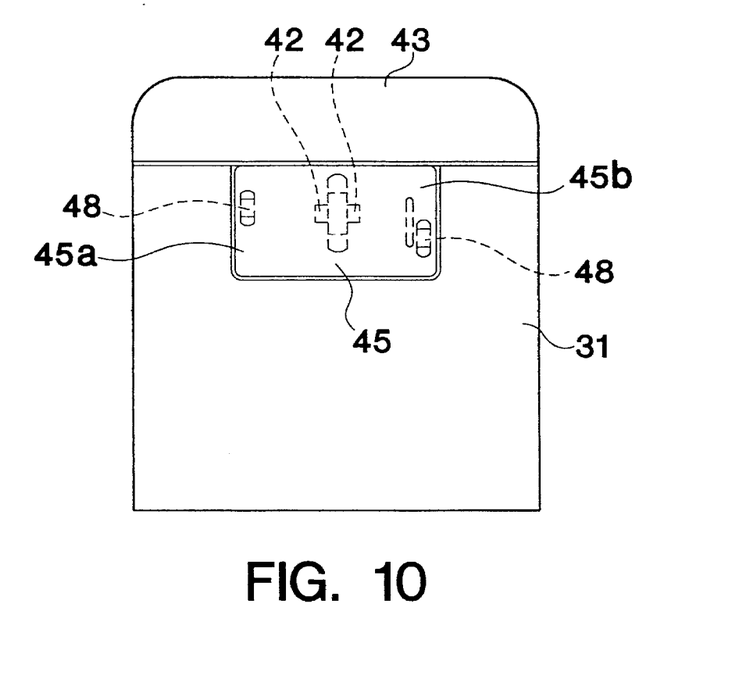
FIG. 10 is a diagram schematically showing, in a front view, said important parts of the embodiment shown by FIG. 9, with the cap being in its closed position.
Figure 11:
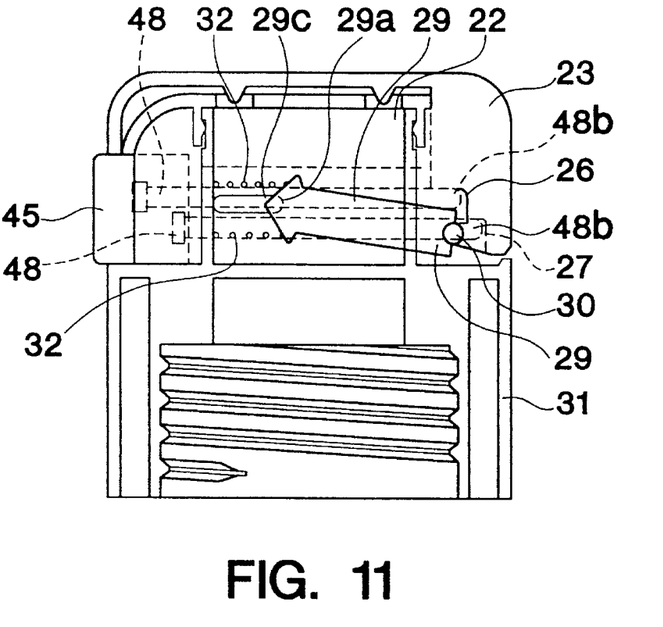
FIG. 11 is a diagram schematically showing, in an axial section, said important parts of the embodiment shown by FIG. 9, with the cap being in its closed position.

Referring to FIGS. 9 through 11, there is illustrated a fourth embodiment of the invention, which is a variant of the third embodiment as has been described just above. This embodiment is similar to the precedent third embodiment in that the cap 43 is pivotally mounted on the container's opening 42 and is provided with cap rotating means operatively associated with depression of the push button 45a exclusively used for cap opening to rotate the cap 43 to its opened position and operatively associated with depression of the push button 45b exclusively associated with depression of the push button 45b exclusively used for cap closing to rotate the cap 43 to its closed position but distinguished from the third embodiment in that the push button 45a exclusively used for cap opening and the push button 45b exclusively used for cap closing are integrated into a single depressor 45 of seesaw type such that a pivotal movement of this depressor's one end serving as one push button around a rotational fulcrum 55 to its depressed position causes the other end serving as the other push button to be pivotally moved around said rotational fulcrum 55 to its home position. Push rod members 48 are provided which include rearward ends 48a and forward ends 48b.

With this variant, the push buttons 45a, 45b used for cap opening and for cap closing, respectively, may be alternately moved to their depressed and restored positions in order to open and close the cap, respectively. In this way, it is possible for this specific embodiment to eliminate the elastic restoring means such as the elastic member(s) 4 (34) used in the precedent embodiments to restore the depressor means to its or their home positions under the restoring force.

As previously mentioned, the fourth embodiment is similar to the third embodiment in construction, operation and effect except that the push buttons 45a, 45b used for cap opening and cap closing, respectively are integrated into the single depressor seesaw type such that the pivotal movement of the depressor's one end serving as one push button around the rotational fulcrum 55 to its depressed position causes the other end serving as the other push button to be pivotally moved around said rotational fulcrum 55 to its restored position. In view of this, the similar parts are designated by the same reference numerals in the drawings to facilitate understanding, and further detailed description will be eliminated to avoid duplication.

It should be understood that reference numeral 56 in FIG. 9 designates a conventional spring member tending to maintain the depressors 45a, 45b in their depressed positions.

Figure 12:
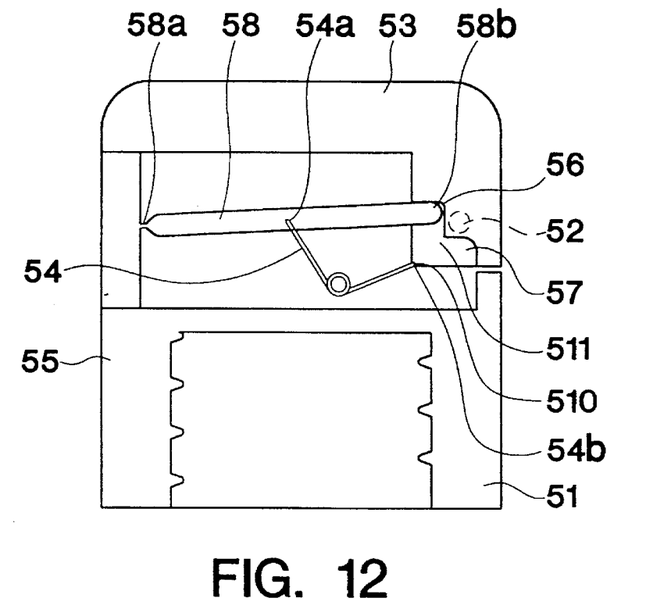
FIG. 12 is a diagram schematically showing, in an axial section, important parts of the cap operating mechanism constructed as a fifth embodiment of the invention, with a cap being in its closed position.
Figure 13:
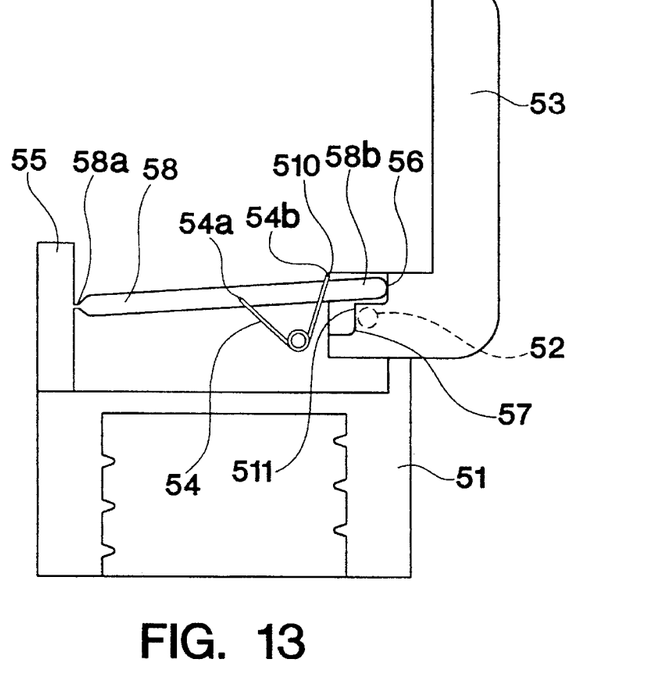
FIG. 13 is a diagram similar to FIG. 12, schematically showing said important parts of the embodiment shown by FIG. 12, with a push button being on the way to its initial position after the cap has been opened.
Figure 14:
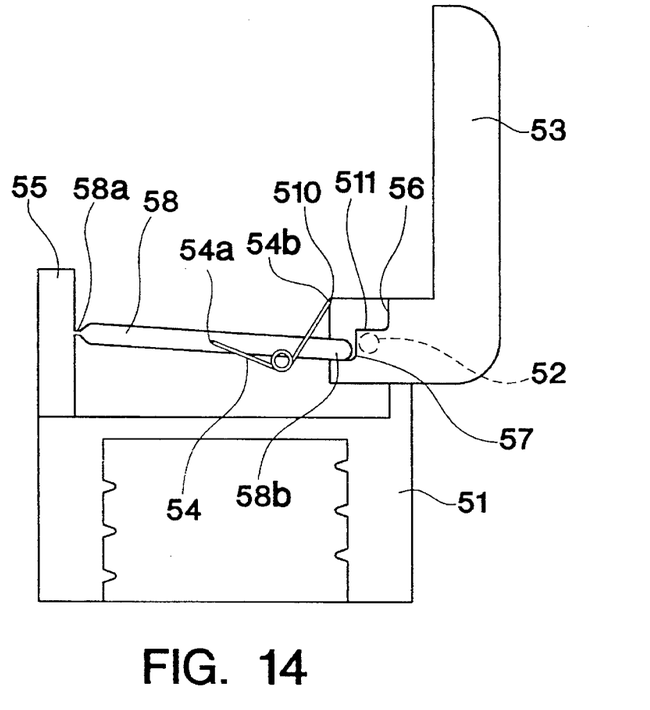
FIG. 14 is a diagram similar to FIG. 12, schematically showing said important parts of the embodiment shown by FIG. 12, with the cap being in its opened position.

Referring to FIGS. 12 through 14, there is illustrated a fifth embodiment, in which the same function as that achieved by the elastic member provided between the push rod member constituting the push rod means and the cap rotating means.

In this fifth embodiment, the cap 53 is mounted by the hinged coupler on the opening's base 51 as in the first embodiment so as to be pivotally opened and closed around the axis 52 of the hinged coupler. The cap 53 is provided on the side of the hinged coupler with the groove 56 serving for cap opening and adapted to be located at a relatively short distance from the push button 55 when the cap 53 is in its closed state, as seen in FIG. 12 and located at a relatively long distance from the push button 55 when the cap 53 is in its opened state and with the groove 57 serving for cap closing which is continuous to said groove 56 serving for cap opening across the transition step 511 and adapted to be located at a relatively long distance from the push button 55 when the cap 53 is in its closed state, as seen in FIGS. 13 and 14, and located at a relatively short distance from the push button 55 when the cap 53 is in its opened state. The push rod member 58 extending between the push button 55 and the cap 53 has the base end 58a pivotally connected to the push button 55 and the forward end 58b being engagable with the groove 56 serving for cap opening and located at a relatively short distance from the push button 55 when the cap 53 is in its closed state and said push button 55 is in its initial position but with the groove 57 serving for cap closing and located at a relatively short distance from the push button 55 when the cap 53 is in its opened state and said push button 55 is in its depressed position, as shown by FIGS. 12 and 14. There is provided the cap rotating means 510 in this embodiment also, which is adapted to be rotated around the axis 52 of the hinged coupler to a position opposite to the groove 56 serving for cap opening as the cap 53 is closed and to a position opposite to the groove 57 serving for cap closing as the cap 53 is opened.

This fifth embodiment further includes the elastic member 54 compressed between an intermediate portion of the push rod member 58 and said cap rotating means 510.

The elastic member 54 constitutes the elastic restoring means serving to restore the push button 55 to its home position and having a forward end 54a engaged with said intermediate portion of the push rod member 58 and the other end 54b pivotally connected on the cap rotating means 510 which is rotated around the axis 52 of the hinged coupler to a position opposite to the groove 56 serving for cap opening as the cap 53 is closed and to a position opposite to the groove 57 serving for cap closing as the cap 53 is opened. Thus the elastic member 54 constitutes the open/close switching means adapted to guide, under the biasing force thereof, the forward end 58b of the push rod member 58 into the groove 56 serving for cap opening as the cap 53 is closed and into the groove 57 serving for cap closing as the cap 53 is opened. Additionally, the elastic member 54 constitutes the direction selective cap biasing means adapted to bias, by its end 54b, the cap 53 to be rotated around the axis 52 of the hinged coupler in the direction in which the cap 53 is maintained in its closed state, as seen in FIG. 12, when the cap 53 is already in its closed state and biases the cap 53 to be rotated in the direction in which the cap 53 is maintained in its opened state, when the cap 53 is already in its opened state, as seen in FIG. 14. In this manner, the elastic member 54 constitutes also the direction selective cap biasing means serving to bias the cap 53 to be rotated in the direction for cap opening or cap closing depending on the angular position of the cap 53 with respect to a transitional position predetermined on the rotational stroke of the cap 53.

Figure 15:
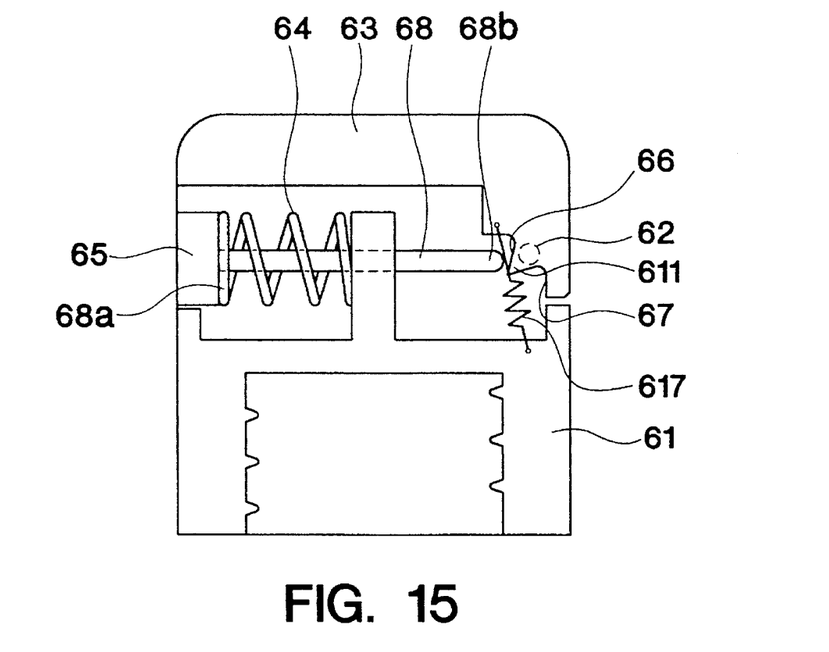
FIG. 15 is a diagram schematically showing, in an axial section, important parts of the cap operating mechanism constructed as a sixth embodiment of the invention, with a cap being in its closed position.
Figure 16:
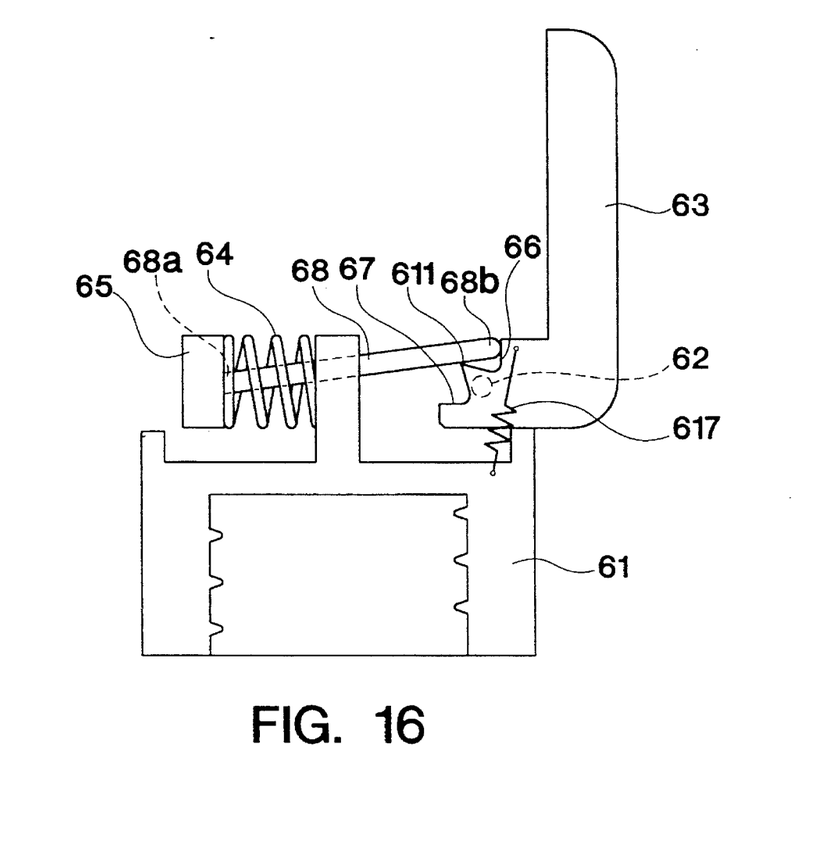
FIG. 16 is a diagram similar to FIG. 15, schematically showing said important parts of the embodiment shown by FIG. 15, with a push button being on the way to its initial position.
Figure 17:
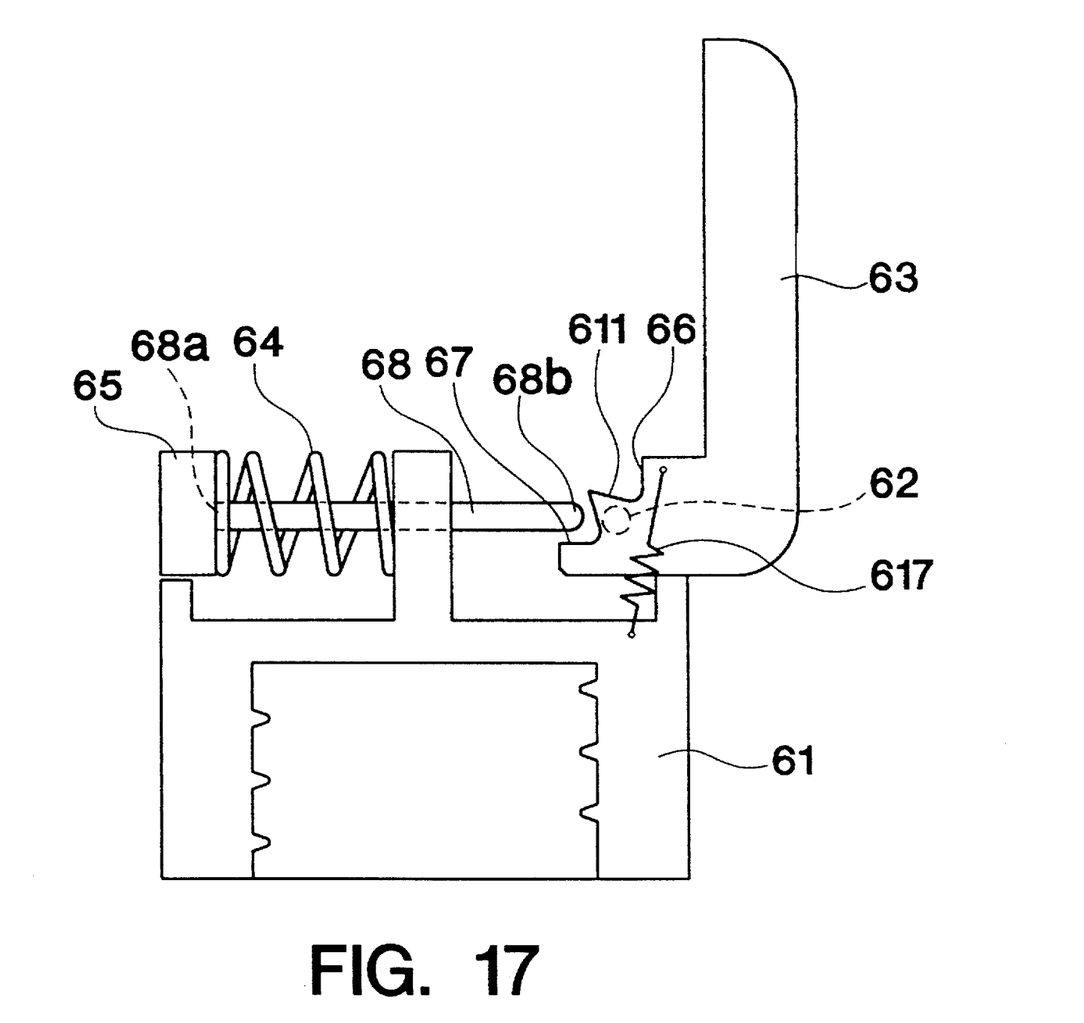
FIG. 17 is a diagram similar to FIG. 15, schematically showing said important parts of the embodiment shown by FIG. 15, with the cap being in its opened position.

Referring to FIGS. 15 through 17, there is illustrated a sixth embodiment of the cap operating mechanism, which is significantly simplified but achieves the same effect as that achieved by the first embodiment.

According to this sixth embodiment, the cap 63 is mounted by the hinged coupler on the opening's base 61 so as to be pivotally opened and closed around the axis 62 of said hinged coupler, in the same manner as in the first embodiment. The cap 63 is provided adjacent the hinged coupler with the groove 66 serving for cap opening which is located at a relatively short distance from the push button 65 when the cap 63 is in its closed state, as shown by FIG. 15, but located at a relatively long distance from said push button 65 when the cap 63 is in its opened state, as shown by FIGS. 16 and 17, and the groove 67 serving for cap closing which is continuous to said groove 66 serving for cap opening across the transition step 611 and located at a relatively long distance from said push button 65 when the cap 63 is in its closed state but located at a relatively short distance from said push button 65 when the cap 63 is in its opened state. The push rod member 68 extending between the push button 65 and the cap 63 has the base end 68a pivotally connected to the push button 65 and the forward end 68b being engagable with the groove 66 serving for cap opening when said push button 65 is in its home position and the cap 63 is in its closed state but with the groove 67 serving for cap closing when the cap 63 is in its opened state, as seen in FIGS. 15 and 17, respectively. There is provided between the push button 65 and the opening's base 61 the elastic restoring means comprising the elastic member 64 tending to restore the push button 65 against a depressing force exerted thereon to its home position. There is provided between the cap 63 and the opening's base 61 the direction selective cap biasing means such as a spring member 617 biasing the cap 63 to be rotated in the direction in which the cap 63 is maintained in its closed state as seen in FIG. 15, when the cap 63 is already in its closed state and biasing the cap 63 to be rotated in the direction in which the cap 63 is maintained in its opened state when the cap 63 is already in its opened state. In other words, the direction selective cap biasing means functions to bias the cap 63 to be rotated in the direction for cap opening or cap closing depending on the angular position of the cap 63 with respect to the transitional position predetermined on the rotational stroke of the cap 63.

In this sixth embodiment, said transition step 611 across which said groove 66 serving for cap opening is continuous to said groove 67 serving for cap closing constitutes the open/close switching means serving to switch the forward end 68b of said push rod member 68 between a position of engagement with the groove 66 serving for cap opening when the cap 63 is in its closed state and a position of engagement with the groove 67 serving for cap closing when the cap 63 is in its opened state. As the push button 65 is elastic restored to its home position immediately after the cap 63 has been opened by depressing said push rod member 68, as seen in FIG. 16, the forward end 68b of the push rod member 68 is retracted from engagement with the groove 66 serving for cap opening and rides across the step 611 into engagement with the groove 67 serving for cap closing, as seen in FIG. 17.

As the push button 65 is elastic restored to its home position immediately after the cap 63 has been closed by depressing again the push rod member 68, the forward end 68b of the push rod member 68 is now retracted from engagement with the groove 67 serving for cap closing and rides across the step 611 into engagement with the groove 66 serving for cap opening, as seen in FIG. 15. In this manner, the transition step functions as the open/close switching means by which the forward end 68b of the push rod member 68 is interchangeably engaged with the groove 66 serving for cap opening and the groove 67 serving for cap closing as the cap 63 is closed and opened, respectively.

It will be appreciated from the foregoing description that the cap operating mechanism of the invention allows the cap to be rotated from its closed position to its opened position by depressing the depressor means such as the push button with one touch action in order to discharge the content of the container, on one hand, and allows also said cap to be rotate from its opened position to its closed position by depressing again said depressor means with one touch action, on the other hand, since the cap operating mechanism of the invention comprises said cap mounted on the container's opening so as to be pivotally opened or closed and the cap rotating means adapted to rotate the cap either in the direction for cap opening or in the direction for cap closing in operative association with a depressing action of the depressor means such as the push button. In this manner, the cap operating mechanism of the invention is convenient for one-hand operation such that the depressor means such as the push button may be depressed, for example, with a castor for seasoning, flavoring or spice being held in one hand, to open or close the cap.

With the alternative embodiment of the inventive cap operating mechanism including the cap rotating means adapted to rotate the cap either in the direction for cap opening or in the direction for cap closing in operative association with a depressing action of the single depressor means such as the single push button, the cap of the castor or the similar container can be opened or closed merely by depressing said single depressor means and therefore, the trouble of shifting the container from one hand to the other can be saved.

The cap operating mechanism of the invention including the cap rotating means adapted to rotate the cap to its opened position in operative association with a depressing action of the depressor used exclusively for cap opening and to rotate the cap to its closed position in operative association with a depressing action of the depressor used exclusively for cap closing, the operation of opening and closing is easy to understand since the depressor means is divided into separate depressors used exclusively for cap opening and cap closing, respectively, and an erroneous operation due to a careless depressing of the depressor means can be avoided.

The cap operating mechanism of the invention provided with the elastic restoring means normally biasing the depressor means to its home position allows the cap to be opened and closed smoothly with one touch action since the depressor means such as the push button is restored by the elastic restoring means to its home position upon release of a depression on the depressor means which can be immediately depressed again.

With the cap operating mechanism of the invention wherein said depressors used exclusively for cap opening can cap closing, respectively, are integrated into the single depressor means of seesaw type, of which the opposite ends serving as said depressors may be alternately depressed so that one end is rotated down around the rotational fulcrum provided at the middle of the depressor means as the other end is rotated upward around said fulcrum to its home position, the cap can be smoothly opened or closed without providing the depressor means with any elastic restoring means.

The cap operating mechanism further comprising push rod member operatively associated with the depressor means to rotate the cap to its opened or closed position allows said push rod means to assure a high driving force as well as a high durability of the mechanism and a reliable direct transmission of a depressing force exerted on the depressor means to open or close the cap.

With the cap operating mechanism of the invention comprising the cap rotating means adapted to rotate the cap to its opened or closed position by the push rod means operatively association with the depressor means and the direction selective cap biasing means adapted to bias the cap to be rotated in the direction for cap opening or for cap closing depending on the angular position of the cap with respect to the transitional position predetermined on the rotational stroke of the cap, the cap can be automatically opened or closed under the action of said direction selective cap biasing means by partially depressing the depressor means such as the push button so as to rotate the cap to said transitional position predetermined on the rotational stroke of the cap in the direction for cap opening or for cap closing, so depressing action of the depressor means can be alleviated, movement of the cap can be made smooth and the cap can be maintained at its opened or closed position with a high stability.

With the cap operating mechanism of the invention particularly including the elastic restoring means for elastically restoring the depressor means in its home position and the above-mentioned direction selective cap biasing means adapted to bias the cap to be rotated in the direction in which the cap is opened or closed depending on the angular position of the cap with respect to the transitional position predetermined on the rotational stroke of the cap, as previously mentioned, the cap can be automatically opened or closed under the action of said direction selective cap biasing means by partially depressing the depressor means such as the push button so as to rotate the cap in the direction for cap opening or for cap closing to said transitional position predetermined on the rotational stroke of the cap and thereupon the depressor means can be also automatically restored to its home position, depressing as well as restoration of the depressor means can be made smooth and light and the cap can be maintained at its opened or closed position with a high stability.

With said cap operating mechanism of the invention wherein the elastic restoring means for elastic restoring the depressor means to its home position and the direction selective cap biasing means adapted to bias said cap to be rotated in the direction for cap opening or for cap closing substantially comprise one and same elastic member, the mechanism can be substantially simplified.

With the cap operating mechanism of the invention wherein the cap rotating means includes a groove taking part in cap opening and adapted to be rotated around an axis of a hinged coupler to a position at a relatively short distance from said depressor means as said cap is closed but to a position at a relatively long distance from said depressor means as said cap is opened and a groove taking part in cap closing adapted to be rotated around said axis to a position at a relatively long distance from said depressor means as said cap is closed but to a position at a relatively short distance from said depressor means as said cap is opened, and the push rod means associated with said depressor used exclusively for cap opening is engaged with said groove taking part in cap opening as said cap is closed and the push rod means associated with said depressor used exclusively for cap closing is engaged with said groove taking part in cap closing as said cap is opened, a high driving force as well as a high durability of the mechanism and a reliable transmission of the depressing force exerted on the depressor means to open or close the cap, on one hand, and an erroneous operation of opening or closing the cap due to careless depression of the depressor means can be avoided because the operation is easy to understood.

With the cap operating mechanism of the invention wherein said cap rotating means includes a groove taking part in cap opening and adapted to be rotated around an axis of a hinged coupler to a position at a relatively short distance from said depressor means as said cap is closed but to a position at a relatively long distance from said depressor means as said cap is opened and a groove taking part in cap closing being continuous to said groove taking part in cap opening across a transition step and rotated around said axis to a position at a relatively long distance from said depressor means as said cap is closed but to a position at a relatively short distance from said depressor means as said cap is opened, and open/close switching means adapted to switch a forward end of said push rod means between a position of engagement with said groove taking part in cap opening occurring as said cap is closed and a position of engagement with said groove taking part in cap closing occurring as said cap is opened, said open/close switching means causes the forward end of the push rod means to be engaged with the groove taking part in cap opening or with the groove taking part in cap closing as the cap is closed or opened, respectively, and the cap can be opened or closed by depressing one and same depressor means. Accordingly, the cap of the container such as a castor of seasoning, flavoring or spice, held in one hand, can be easily and rapidly opened or closed by said one hand with one touch action.

With said cap operating mechanism of the invention wherein the open/close switching means comprises the transition step across which said groove taking part in cap opening is continuous to said groove taking part in cap closing, the forward end of the push rod means confronts the groove taking part in cap closing when the cap is in its opened state and confronts the groove taking part in cap opening when the cap is in its closed state. Such arrangement allows the open/close switching means to be advantageously simplified in structure thereof.

With said cap operating mechanism of the invention wherein said cap is provided with cap rotating means adapted to be rotated around the axis of the hinged coupler to a position on the side opposite to said groove taking part in cap opening as said cap is closed but to a position on the side opposite to said groove taking part in cap closing as said cap is opened, and said open/close switching means is provided between said cap rotating means and said push rod means so that the forward end of said push rod means is guided into the groove taking part in cap opening as said cap is closed and into the groove taking part in cap closing as said cap is opened under the biasing force of said elastic member, the forward of the push rod means can be guided into the groove taking part in cap opening or into the groove taking part in cap closing under the action of the open/close switching means comprising the elastic member normally compressed between the cap rotating means adapted to be rotated around the axis of the hinged coupler as the cap is closed or opened, respectively, and the push rod means. In this way, the structure of said open/close switching means can be substantially simplified and, in addition, this open/close switching means comprising the elastic member can function simultaneously as the elastic restoring means biasing the push rod means to restore the depressor means to its home position and as the direction selective cap biasing means biasing the cap rotating means to rotate the cap in the direction for cap opening or for cap closing depending on the angular position of the cap with respect to the transitional position predetermined on the rotational stroke of the cap.

With said cap operating mechanism of the invention comprising cap rotating means adapted to be rotated around the axis of the hinged coupler to a position on the side opposite to said groove taking part in cap opening as said cap is closed but to a position on the side opposite to said groove taking part in cap closing as said cap is opened, open/close switching means having one end engaged with said cap rotating means and the other end slidably engaged along the push rod means, and elastic restoring means normally compressed between said open/close switching means and the depressor means for elastic restoring said depressor means to its home position so that, under the biasing force of said elastic restoring means, said open/close switching means guides the forward end of the push rod means into the groove taking part in cap opening as said cap is closed and into the groove taking part in cap closing as said cap is opened, both the operation of opening the cap and the opening of closing the cap can be performed by depressing one and same depressor means such as the push button. This specific arrangement allows the cap of a container being held in one hand, for example, a castor of seasoning, flavoring or spice to be opened or closed by said one hand with one touch action. Additionally, the elastically restoring means normally biasing the depressor means to be restored to its home position, the cap rotating means normally biasing the cap to be rotated to its opened or closed position and the elastic means constituting said open/close switching means can be realized by the same elastic means and thereby the cap operating means itself can be simplified.

This invention can provide, in addition to the cap operating mechanism arranged so that the cap is opened or closed substantially in a vertical direction, the cap operating mechanism arranged so that the cap is opened or closed transversely of the container's opening, i.e., along a horizontal or sloped plane.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A cap operating mechanism comprising:

a cap pivotally mounted on a container adjacent to an opening of said container;

cap rotating means provided on said cap for selectively rotating said cap between opened and closed positions, which define a rotational stroke;

a push rod operatively associated with depressor means for actuating said cap rotating means, elastic restoring means for elastic restoring said depressor means to a home position, and direction selective cap biasing means for biasing said cap in a first direction in which said cap is opened and in a second direction in which said cap is closed depending on an angular position of said cap with respect to a transitional position predetermined on said rotational stroke of said cap.

2. The cap operating mechanism according to claim 1, wherein said depressor means comprises a push button.

3. The cap operating mechanism according to claim 1, wherein said depressor means comprises a single push button.

4. The cap operating mechanism according to claim 1, wherein said depressor means includes a first depressor used exclusively for cap opening to rotate said cap to the opened position and a second depressor used exclusively for cap closing to rotate said cap to the closed position.

5. The cap operating mechanism according to claim 4, wherein said first and second depressors are integrated into a single rocker unit arranged so that, when a first end thereof serving as said first depressor is pivoted around a fulcrum provided at a middle portion of said single rocker unit, a second end serving as the second depressor is automatically restored to said home position.

6. The cap operating mechanism according to claim 1, wherein said direction selective cap biasing means selectively biases said cap in said first direction in which the cap is opened and in said second direction in which said cap is closed depending on said angular position of said cap with respect to a transitional position predetermined on said rotational stroke of said cap.

7. The cap operating mechanism according to claim 1, wherein the elastic restoring means and the direction selective cap biasing means are substantially formed as one elastic member.

8. A cap operating mechanism comprising:
a cap pivotally mounted on a container adjacent to an opening of said container;
cap rotating means provided on said cap for selectively rotating said cap between opened and closed positions;
a push rod operatively associated with depressor means for actuating said cap rotating means, said cap rotating means including:
a groove for cap opening adapted to be rotated around an axis of a hinged coupler from a position which is a relatively short distance from said depressor means as said cap is closed to a position which is a relatively long distance from said depressor means as said cap is opened;
a groove for cap closing being continuous with said groove for cap opening across a transition step and adapted to be rotated around said axis from a position which is a relatively long distance from said depressor means as said cap is closed to a position which is a relatively short distance from said depressor means as said cap is opened; and
open/close switching means for switching a forward end of said push rod between a position of engagement with said groove for cap opening occurring as said cap is closed and a position of engagement with said groove for cap closing occurring as said cap is opened.

9. The cap operating mechanism according to claim 8, wherein said depressor means includes a first push button for cap opening and a second push button for cap closing.

10. The cap operating mechanism according to claim 8, wherein the open/close switching means includes a step across which said groove for cap opening and said groove for cap closing are continuous with one another.

11. The cap operating mechanism according to claim 8, wherein said open/close switching means includes an elastic member provided between said cap rotating means and said push rod so that a forward end of said push rod is guided into the groove for cap opening as said cap is closed and into the groove for cap closing as said cap is opened, under a biasing force of said elastic member.

12. The cap operating mechanism according to claim 8, wherein said open/close switching means includes a first end engaged with said cap rotating means and a second end slidably engaged along the push rod, said cap operating mechanism further including elastic restoring means normally compressed between said open/close switching means and the depressor means for elastic restoring said depressor means to a home position so that, under a biasing force of said elastic restoring means, said open/close switching means guides a forward end of the push rod into the groove for cap opening as said cap is closed and into the groove for cap closing as said cap is opened.

13. A cap operating mechanism comprising:
a cap pivotally mounted on a container adjacent to an opening of said container;
cap rotating means provided on said cap for selectively rotating said cap between opened and closed positions;
a push rod operatively associated with depressor means for actuating said cap rotating means, elastic restoring means for elastic restoring said depressor means to a home position, direction selective cap biasing means for biasing said cap in a first direction in which said cap is opened and in a second direction in which said cap is closed depending on an angular position of said cap with respect to a transitional position predetermined on a rotational stroke of said cap, said cap rotating means including:
a groove for cap opening adapted to be rotated around an axis of a hinged coupler from a position which is a relatively short distance from said depressor means as said cap is closed to a position which is a relatively long distance from said depressor means as said cap is opened;
a groove for cap closing which is continuous with said groove from cap opening across a transition step and adapted to be rotated around said axis from a position which is a relatively long distance from said depressor means as said cap is closed to a position which is a relatively short distance from said depressor means as said cap is opened; and
open/close switching means for switching a forward end of said push rod between a position of engagement with said groove for cap opening as said cap is closed and a position of engagement with said groove for cap closing as said cap is opened, wherein the elastic restoring means and the direction selective cap biasing means are substantially formed as one elastic member.

14. The cap operating mechanism according to claim 13, wherein the cap is pivotally mounted on the opening of the container so as to be opened and closed transversely of said container opening.

* * * * *